United States Patent [19]

Lehureau

[11] 4,321,634

[45] Mar. 23, 1982

[54] ENDLESS MAGNETIC TAPE VIDEO RECORDER/PLAYER WITH HEAD CENTERING MEANS

[75] Inventor: Jean-Claude Lehureau, Paris, France

[73] Assignee: Thomson-CSF, Paris, France

[21] Appl. No.: 146,412

[22] Filed: May 5, 1980

Related U.S. Application Data

[63] Continuation of Ser. No. 948,337, Oct. 3, 1978, abandoned.

[30] Foreign Application Priority Data

Oct. 7, 1977 [FR] France ................................ 77 30244

[51] Int. Cl.³ .......................................... G11B 21/10
[52] U.S. Cl. ...................................... 360/70; 360/21; 360/22; 360/33; 360/77; 360/107
[58] Field of Search ................... 360/21, 22, 23, 33, 360/70, 75, 77, 83, 107, 109, 121, 88

[56] References Cited

U.S. PATENT DOCUMENTS

| | | | |
|---|---|---|---|
| 2,952,745 | 9/1960 | Walker | 360/23 |
| 2,989,595 | 6/1961 | Hunter | 360/21 |
| 3,126,535 | 3/1964 | Streeter | 360/77 |
| 3,149,207 | 9/1964 | Maxey | 360/83 |
| 3,576,553 | 4/1971 | Hertrich | 360/77 |
| 3,665,118 | 5/1972 | Cooper | 360/21 |
| 3,686,433 | 8/1972 | Camras | 360/33 |
| 3,885,090 | 5/1975 | Rosenbaum | 360/33 |
| 3,975,764 | 8/1976 | Kobayashi | 360/23 |

FOREIGN PATENT DOCUMENTS

| | | | |
|---|---|---|---|
| 1326700 | 8/1973 | United Kingdom | 360/83 |
| 1438977 | 6/1976 | United Kingdom | 360/83 |
| 1464922 | 2/1977 | United Kingdom | 360/83 |

*Primary Examiner*—James W. Moffitt
*Assistant Examiner*—Alan Faber
*Attorney, Agent, or Firm*—Cushman, Darby & Cushman

[57] ABSTRACT

A device for recording and playing back information comprising an endless tape whereof one part has a translational movement in a direction x and n magnetic heads integral with one another whereof the gaps face that part and are aligned in a transverse direction y. The heads have a slow movement in the direction y and form n continuous tracks forming parallel and equidistant portions in the direction y.

6 Claims, 12 Drawing Figures

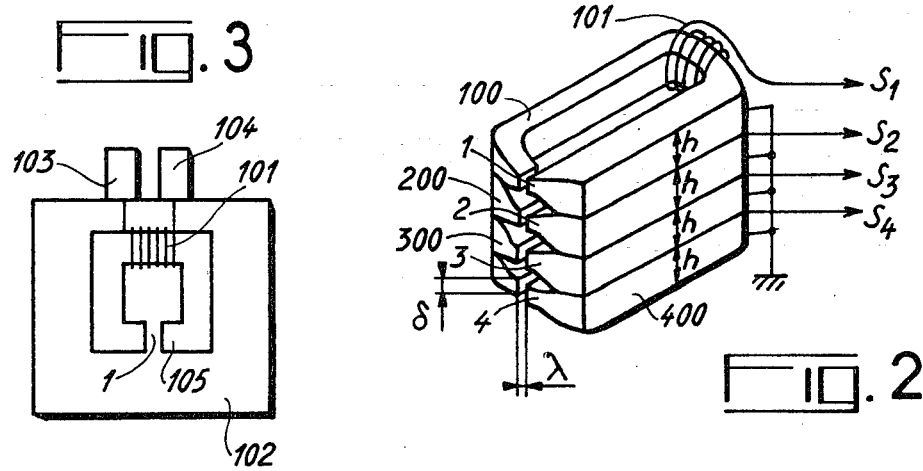
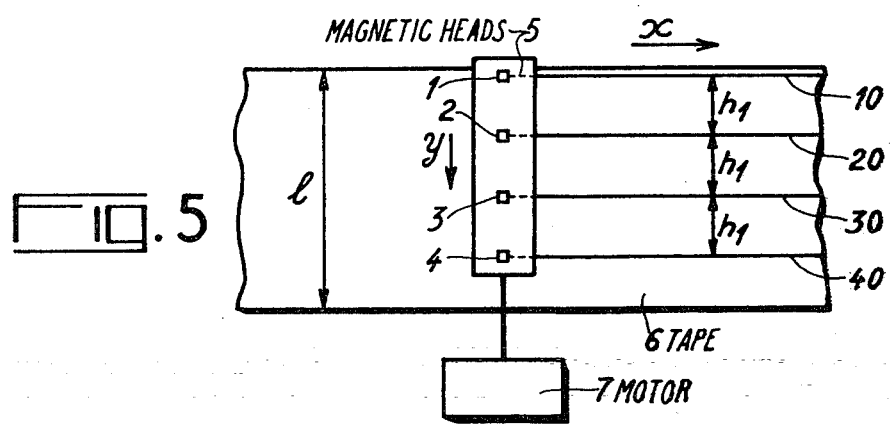
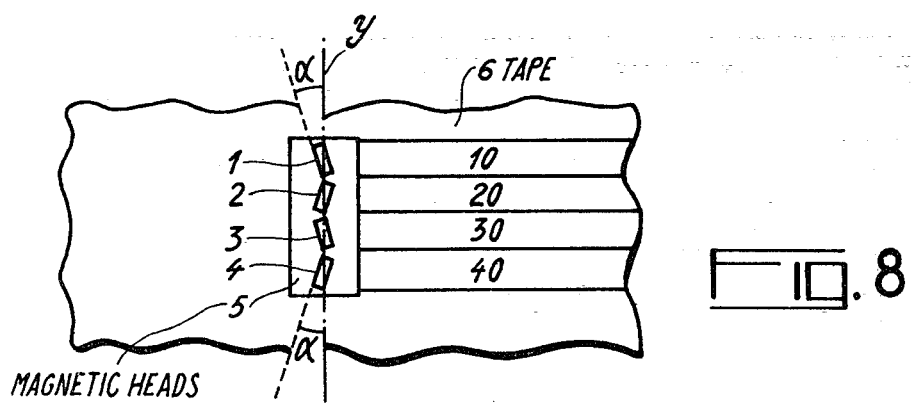

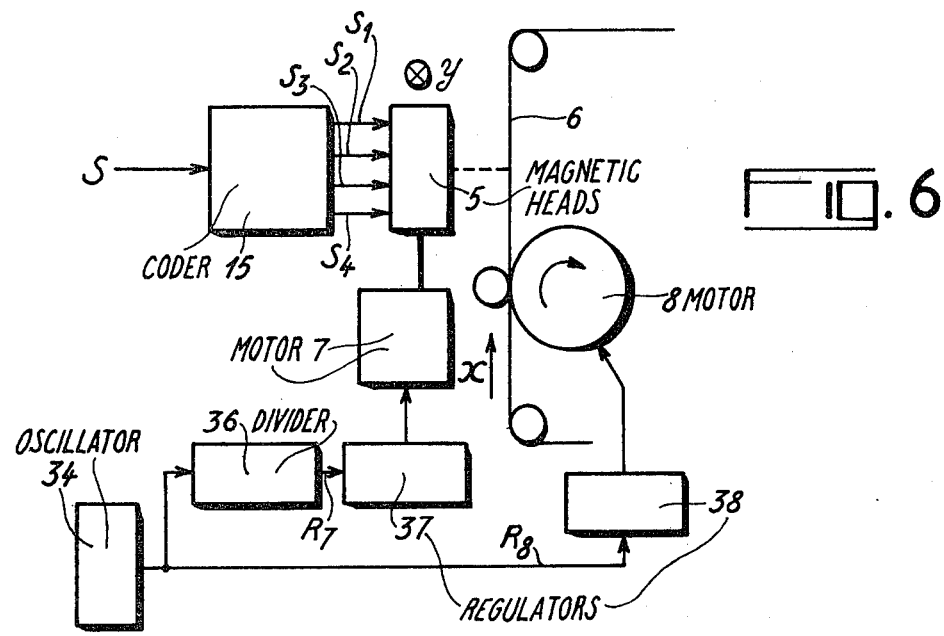
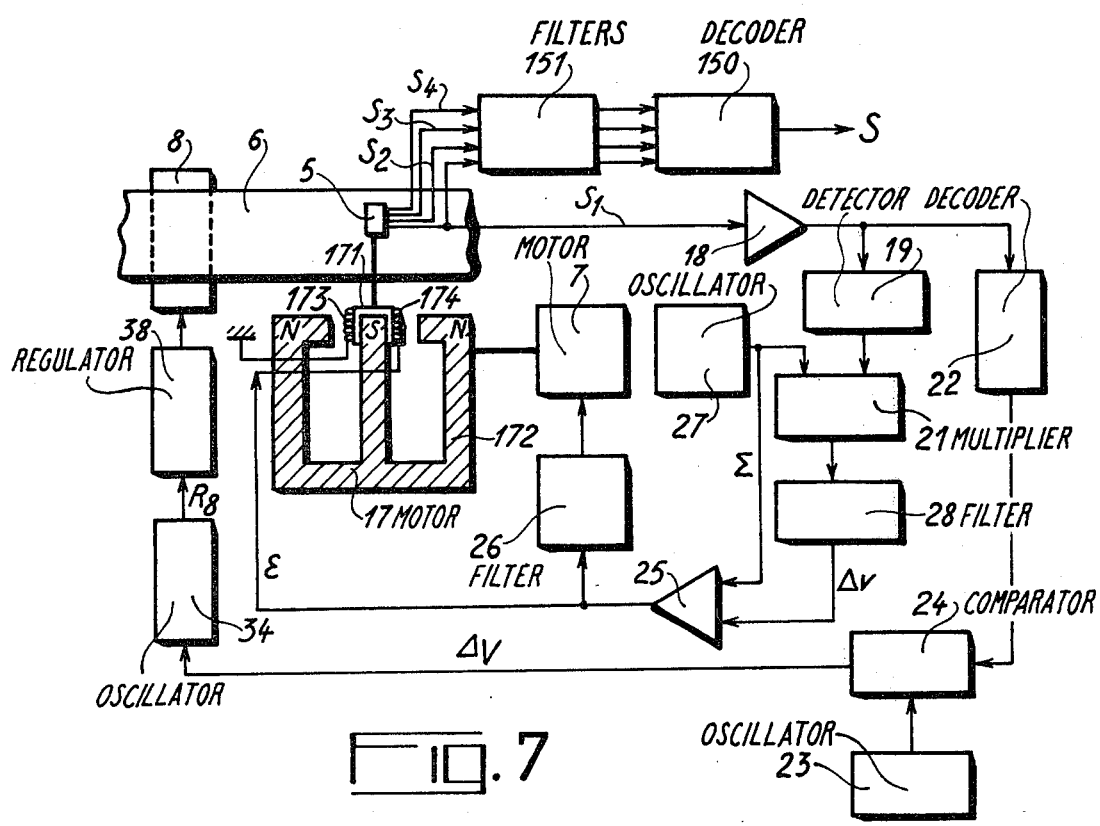

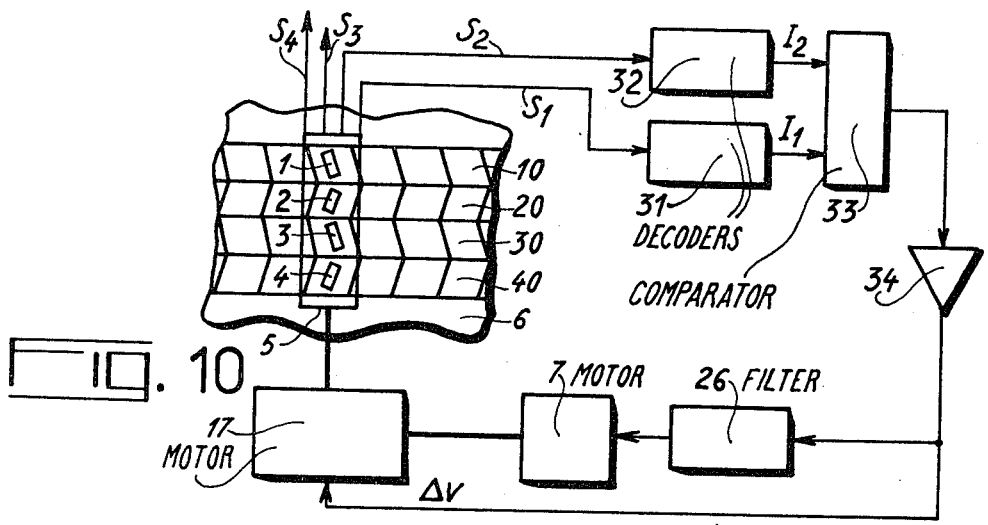
FIG. 10
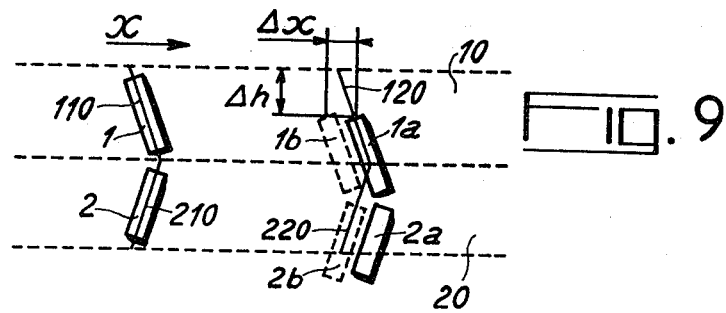
FIG. 9
FIG. 11
FIG. 12

ENDLESS MAGNETIC TAPE VIDEO RECORDER/PLAYER WITH HEAD CENTERING MEANS

This is a continuation, of application Ser. No. 948,337 filed Oct. 3, 1978, now abandoned.

The present invention relates to devices for recording and playing back information on a magnetic tape by virtue of at least one magnetic head whereof the gap faces the tape, this head having a continuous movement relative to the tape.

Various types of video tape recorders, generally comprising a plurality of magnetic heads, are used in order to record signals in the video-frequency range. In order to obtain the desired pass-band without too many heads, the relative speed between the tape and the heads must be very high. The solution generally used resides in imparting a rapid rotary movement to the heads combined with a translation of the tape. In video tape recorders of the "quadruplex" type, 4 magnetic heads are arranged on a drum rotating at high speed with a rotational axis parallel to the direction of translation of the tape. Their arrangement on the drum gives rise to portions of track parallel to the transverse direction of the tape. In video tape recorders of the "helical-scan" type, the tape is arranged so as to form a loop round the record-playback member. A magnetic head rotates with respect to this loop with an axis of rotation slightly off-centre with respect to the centre of the loop, thus forming on the tape as it is unwound a helical track having parallel portions slanting with respect to the transverse direction. In both cases the track obtained is discontinuous, and forms parallel portions. These two types of video-tape recorders require complex, heavy and expensive mechanical elements. The price of the "quadruplex" video tape recorder limits it to professional applications. Video tape recorders of the "helical-scan" type are less expensive, but require complicated servo-controls since centring is critical.

An object of the present invention is to provide a simpler, less fragile and less expensive record-playback device capable of forming part of a reporting unit which is easily transportable by virtue of its low weight. For this purpose, the device according to the invention enables rotary movement of the head to be avoided by using, instead of a magnetic carrier in the form of a ribbon transferred from a feed spool to a take-up spool, a loop known as an "endless tape" such as that usually used for sound recording. In order to use all the available width of the tape, a slow movement is imparted to the magnetic heads in a direction transverse to the tape, while the tape moves past indefinitely in the longitudinal direction. The slow movement is easily obtained by simple mechanical means, and may be regulated above all during playback by a likewise simple servo-control loop in order to ensure the tracking. The tracking of the tape by the magnetic heads is continuous, which eliminates the problems of synchronisation. The device is thus appreciably less sensitive to faults in the tape due to stretching for example, and to any possible vibration. Finally, a variant of embodiment enables crosstalk between tracks to be considerably reduced, and the tracking servo-control to be simplified by virtue of angular offset of the record-playback gaps.

According to the present invention, there is provided a video tape recording and playback device comprising an endless magnetic tape, driving means for continuously moving said tape, at least one magnetic head having a gap facing a part of said tape and two terminals for the input and output and electrical voltage, and mechanical means for moving said head in front of said part in a direction y; said driving means causing a displacement of said part in a direction x perpendicular to y.

Other features and advantages of the invention will appear by means of the following description and the appended Figures, wherein:

FIGS. 2 and 3 shows two embodiments of a stack of 4 magnetic heads;

Figure 4:
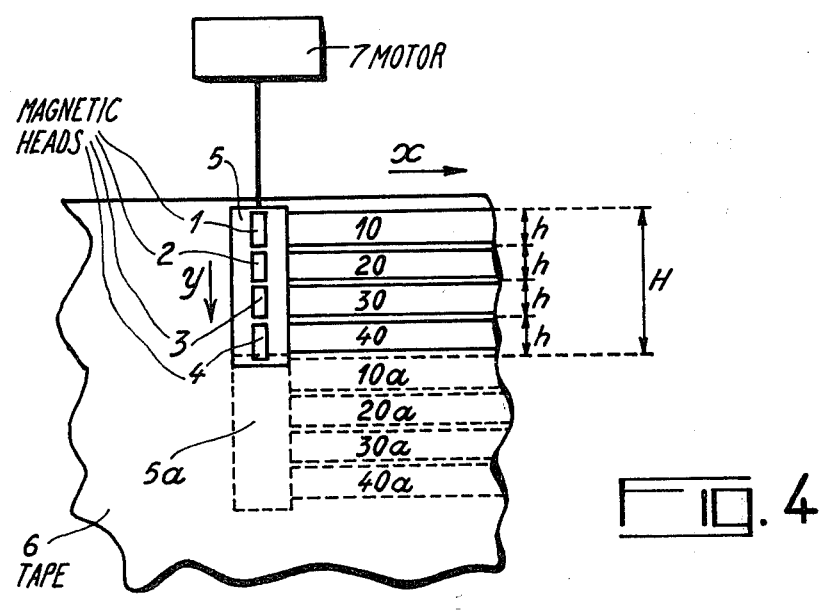

FIGS. 4 and 5 diagrammatically illustrate 2 ways of using the stack of heads according to the invention;

FIG. 6 shows a recording device according to the invention;

FIG. 7 shows a playback device according to the invention;

FIG. 8 shows a variant in the arrangement of the record-playback gaps;

FIG. 9 is an explanatory diagram;

FIG. 10 is a diagram of servo-control loop used with the variant of FIG. 8;

FIG. 11 shows an embodiment of an information coder used for the invention;

FIG. 12 is a set of chronograms illustrating the operating of the coder.

Figure 1:
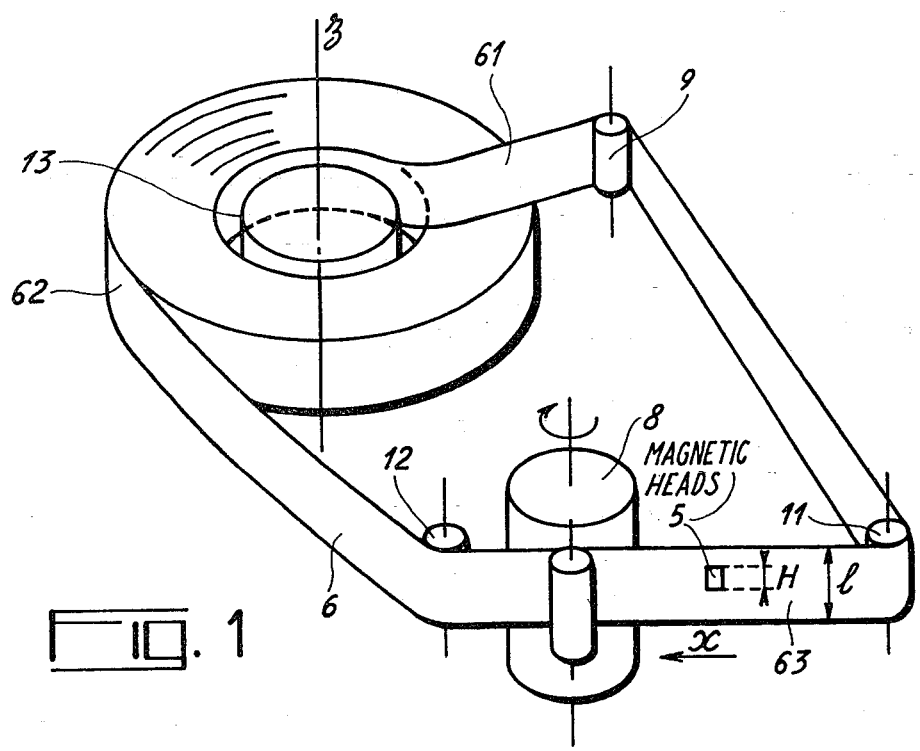
FIG. 1 shows a case containing an "endless tape;"

FIG. 1 illustrates the interior of a case containing an endless tape. The magnetic tape 6 is wound round a spool 13 having a rotational axis z. Its two ends have been joined in order to form an endless loop: the part 61 emerging from the interior of the winding is guided by a series of rollers 9, 11, 12, and rejoins the part 62 situated outside the winding. A roller 8 connected to a driving motor causes the tape to move past, and the tape winds on outside at the same time as it unwinds from the inside, which is made possible by the fact that the wound-on turns slide with respect to one another and that the feed zone is situated inside the winding. Recording-playback means 5 are provided in front of that part 63 of the fraction of tape 6 which is moving past between the rollers 11 and 12. Such a case is usually intended for recording sound. It is then used at a speed of 10 cm/s. The length L of the tape is equal to 150 m, its width 1 is equal to 6.3 mm for a "quarter-inch" tape, 12.6 mm for a "half-inch" tape, etc. . . In altogether unexpected fashion, experience shows that, in spite of friction, a speed much higher than 10 cm/s may be reached without either breaking the tape or spoiling the recorded signal. For example, the tape retains good quality of reproduction at the end of about a hundred hours of operation at a speed of 2.5 m/s. The invention provides for using this tape at the speed of 2.5 m/s for the purpose of recording signals having a wide frequency-band, such as video signals. At such a speed, a signal having a pass-band of 2 MHz may be recorded with a signal-to-noise ratio of about 35 dB, using a magnetic head whereof the gap-height is about 50μm. The use of two heads enables a video signal of moderate quality to be recorded on two contiguous tracks, one of the tracks being reserved for luminance, and the other for chrominance and sound. The use of a stack of eight heads makes it possible to record on eight separate tracks a television signal having a pass-band of 16 MHz split up into eight components by a coding device. These two examples do not limit the invention. In the absence of any indication to the contrary, in the remainder of the description the recording-playback means 5 will consist of a stack of 4 magnetic heads describing 4 separate tracks.

Referring to FIG. 2, a group of four magnetic heads 100, 200, 300, 400 are stacked in the direction of the height of their respective gaps 1, 2, 3, 4. Each head comprises a winding, one only, 101, being visible in the Figure. For recording, a signal emanating, as will be seen later, from a coding device having 4 output channels is supplied between the terminals of each winding. For playback, signals $S_1$, $S_2$, $S_3$, $S_4$ respectively characterising the items of information written in onto the 4 tracks and read out by the 4 heads 100, 200, 300, 400 are picked up at the terminals of their winding. The distance between the tracks recorded or read out depends on the height h of the heads, which may be slightly greater than the height $\delta$ of the gaps, which itself determines the width of the tracks. The height $\delta$ of the gaps may be around 30 to 50 $\mu$m and their a width $\lambda$ about 0.5 $\mu$m. It is nevertheless critical to obtain total heights h small enough. If it is desired that the tracks described by the 4 heads be very close together (about 50 $\mu$m apart), it will therefore be preferable to use integrated magnetic heads such as that illustrated in FIG. 3. Conventional masking techniques are used in order to deposit on a substrate 102 made of a non-conductive and non-magnetic material a layer of magnetic material 105 in the form of a ring intersected by a gap 1. The winding 101 of the head is obtained by depositing conductive turns, for example of copper, before and after depositing the layer 105. The two ends of the winding are joined to two output terminals 103 and 104 at which the signal $s_1$ is supplied or picked up. The desired gap-heights are thus very easily obtained. Similar heads having the desired total height h may be stacked.

FIG. 4 diagrammatically shows one way of using the stack of heads 5 according to the invention. For better understanding, the casing containing the stack of heads 5 has illustrated on it the respective gaps 1, 2, 3, 4 of the heads 100, 200, 300, 400, these latter being embodied in accordance with one of the two forms of FIGS. 2 and 3. As the tape 6 is unwound in the direction x, each head tracks a track having a width $\lambda$ which will be considered to be slightly equal to h. The portions 10, 20, 30, 40 respectively tracked by the gaps 1, 2, 3, 4 are therefore contiguous, and occupy a width $H = 4 \times h$ of the tape 6. The value of H is much less than the total width 1 of the track. This is why the invention provides for imparting to the stack of heads 5 a transverse translational movement, in a direction y perpendicular to x in the plane of the tape 6, so that, if the total length of the tape were unwound and the tape were placed round a cylinder, four overlapping helical tracks would be obtained. For this purpose, the stack of heads 5 is mechanically connected to a motor 7, and its translational speed is such that, at the end of the unwinding of a complete length of tape, the stack 5 is in a position 5a at a distance from the initial position which is greater than or equal to H. The tracked portions 10a, 20a, 30a, 40a follow in the direction y the portions 10, 20, 30, 40 tracked on the preceding revolution. It is desirable to make maximum use of the width of the tape, and it is therefore preferable to choose a helical pitch exactly equal to $H = 4 \times h$. Under these conditions, the number of parallel portions of tracks following one another with a pitch h in the width 1 of the tape is (1/h), which is obtained at the end of (1/4 h) times the complete unwinding of the tape. V being the speed at which the tape moves in the direction x, and v the transverse speed of the stack 5 in the direction y, with, by way of example $h = 50$ $\mu$m, $L = 150$ m, $V = 2.5$ m/s, each complete unwinding of the tape lasts 1 mm, and $v = 0.2$ mm/mn. Signals having a pass-band of 2 MHz may be recorded on a tape having a width 1 of 12.6 mm along 240 parallel portiions of track by making it run over its whole length 60 times if there are 4 heads, and 30 times if there are 8 heads, the recording then lasting for half an hour. The product: "duration x pass-band" of the device according to the invention is 8 hours $\times$ MHz for the chosen values of L, 1, V. This results in a device of high performance with respect to existing magnetic video tape recorders with simple, cheap and strong mechanical means: cases containing a loop of magnetic tape which winds in endless fashion, a stack of heads 5, a motor 8 equipped with a roller associated with the cartridge and a motor 7 providing very slow feed and associated with the stack 5.

FIG. 5 illustrates a variant of embodiment in which the heads are not juxtaposed with one another as in FIG. 2, but are separated by a distance $h_1$, while remaining integral with one another. This arrangement enables non-integrated heads to be used while preserving the same track-pitch as before, the movement of the stack of heads being the same. Only the arrangement of the tracks on the tape is modified, and it may be seen in the FIG. that the distance $h_1$ separating the gaps 1, 2, 3, 4 is about equal to a quarter of the width 1 of the tape 6. The translational speed v of the stack 5 is such that, at the end of a revolution, each portion of track 10, 20, 30, 40 is shifted with a value at least equal to the head height h. The speed v is therefore 4 times less great than before if the same track-pitch h is maintained. 4 helices of a pitch h are thus obtained, being independent instead of overlapping one another. Recording stops when the last portion of track followed by a gap (1 for example) is at a distance h from the first portion of track followed by the following gap (that is to say the gap 2). The stack of heads 5 will then have moved forwards by a distance $h_1$, while in the foregoing case it had moved forwards 4 times more quickly by a distance $1 = 4h_1$. Playback and recording must naturally be carried out with the same stack of heads in order to respect the arrangement of the tracks. The total number of portions of track is identical with the foregoing case, as is the duration of the recording.

A device such as that shown diagrammatically in FIG. 1 and one of FIGS. 4 and 5 could be used without any other element for recording and then playing back information via a magnetic tape. However, because of instabilities of various types due either to the mechanical means or to the tape oscillating, it proves in practice to be necessary to supplement it with servo-control loops, enabling the conditions set out above relating to the speeds v and V to be respected on recording, and the tracks written in to be satisfactorily followed at the desired speed on playback in order to reconstitute the information with as few errors as possible.

Referring to FIG. 6, an electrical signal S characterising the information to be recorded is split up into n components (n=4 in the FIG.) by means of a coder 15 which will be detailed hereinafter. This coder makes available 4 signals $S_1$, $S_2$, $S_3$, $S_4$ whereof the pass-band is compatible with the possibilities of the device (dimensions of recording heads 5 and speed of the tape 6). Each of these signals may according to circumstances consist of a carrier frequency-modulated by the information or of a numerical signal. The 4 heads which make up the stack of heads 5 are respectively supplied by the 4 signals for the recording on 4 tracks on the tape 6 in the form of modifications to the magnetic characteristics of the tape. The motor 8 driving the tape 6 at the speed V and the motor 7 translating the stack of heads 5 at the speed v have respectively regulators 38 and 37 controlled by a synchronising signals $R_8$ and $R_7$. The signal $R_8$ emanates from an oscillator 34 whereof the frequency f is so chosen as to obtain the desired speed V. The signal $R_7$ emanates from a frequency-divider 36 receiving the signal $R_8$ and having a division ratio so chosen as to obtain the desired speed v. The speed v must be very accurate in order to avoid any track overlaps.

FIG. 7 illustrates a device for playing back a magnetic tape 6, recorded by the device of FIG. 6. Playback requires much greater accuracy than recording. The playback device is provided with a servo-control of the radial position of the stack of heads by means of a signal characterising the radial tracking error, and a "longitudinal" servo-control by monitoring the tape speed with synchronising pulses recorded onto the tape itself upon recording. The operation of the device of FIG. 7 implies that the information signal S, a television signal for example, comprises high-frequency synchronising pulses. The line pulses, which have a frequency of 15625 Hz in the European television standard and a frequency of 15750 Hz in the U.S. standard, may be used for this purpose, the information being coded in the coder 15 in such a manner that these pulses may subsist in at least one of the signals $S_1$ to $S_4$, $S_1$ for example. Each head of the stack of heads 5 delivers a signal ($S_1$ to $S_4$) which is a function of the magnetic characteristics of the portions of tape tracked by the heads. The 4 signals are processed by a decoder 150, which decodes in a manner corresponding to the coding carried out by the coder 15, for the purpose of delivering a signal S. A decoder 22 extracts the line pulses from the signal $S_1$ amplified by an amplifier 18, and a phase-comparator 24 delivers an error signal $\Delta V$ proportional to the phase-difference found between these line pulses and reference pulses delivered by an oscillator 23 at the line-frequency. The error signal $\Delta V$ enables the oscillator 34 described in reference with FIG. 6 to be controlled. This makes the translational speed V of the tape on playback equal to the speed on recording. The radial servo-control of the stack of heads 5 is based on a wobble process: a low-amplitude transverse oscillation is imparted to the stack 5 at a frequency f above the frequency-band of the tracking errors which it is desired to correct and below the frequency-band of the signals $S_1$ to $S_4$. For this purpose, the stack of heads 5 is made integral with the moving coil 171 of an electrodynamic motor 17 of the loudspeaker-drive type whereof the base 172 is mechanically connected to the radial feed motor 7. The moving coil 171 is moved by a signal $\Sigma$ supplying the terminals 173 and 174 of the moving coil and resulting from the sum, provided by a summation amplifier 25, of a signal $\Sigma$ having a frequency f delivered by an oscillator 27 and an error signal $\Delta v$ characterising the tracking error. The periodic excursion and radial correction are thus carried out by the same element 17. A group 151 of high-pass filters enables the component at the frequency f to be eliminated from the signals $S_1$ to $S_4$ before they are processed by the decoder 150. The servo-control loop comprises: an envelope-detector 19 receiving the signal $S_1$ after it has been amplified by the amplifier 18, the oscillator 27 providing the signal $\Sigma$ and the signal emanating from the detector 19, a low-pass filter 28 eliminating from the product signal the components at frequencies greater than or equal to f and supplying the error signal $\Delta v$, and the summator 25 referred to above.

When the tracking made by the magnetic head 100 which provides the signal $S_1$ is satisfactory, the oscillation at the frequency f set up in a direction radial to the track produces amplitude modulation of the signal $S_1$ at the frequency 2f. Indeed, the read out signal is maximal at the centre of the portion of track, and decreases when this centre is departed from. When the mean position of the head 100 departs from this centre by a value of $\Delta h$, modulation of the signal $S_1$ at the frequency f is added to the modulation at a frequency of 2f. The modulation level at the frequency 2f increases, while the modulation level at the frequency 2f decreases, when $\Delta h$ increases. Moreover, the phase of the modulation (positive or negative) depends on the polarity of the error $\Delta h$. After multiplication by the reference signal and filtering of the components at frequencies of f, 2f, 3f, the signal $\Delta v$ is obtained, of suitable amplitude and polarity to control the motor 17 and preserve tracking. A low-pass filter 26 extracts the d.c. component from the error signal $\Delta v$ or from the signal $\Sigma$ and controls the motor 7 in order to impart regular forward feed to the unit consisting of the motor 17 and the stack of heads 5. It is clearly understood that the recording device illustrated in FIG. 6 and the playback device illustrated in FIG. 7 are only examples of embodiment which do not limit the invention. The latter allows of numerous variants, more particularly of the servo-control loops of the playback device. For the recording device, a variant of FIG. 6 resides in introducing radial servo-control of the position of the stack of heads 5 with respect to a portion of track already recorded. A magnetic playback head is provided for this purpose: if n heads are required for recording, the stack of heads 5 comprises n+1 heads, one of them being a playback head (for example, referring to FIG. 4, the head having the gap 1). The speed v of radial feed is provided so that the playback head will follow previously recorded a track so that the portion of track being followed at each instant by the playback head will coincide with the portion of track followed on the previous revolution of the winding of tape by the recording head situated at the other end of the stack 5, that is to say, referring to FIG. 4, the head having the gap 4. This result is obtained when the displacement of the stack of heads 5 during a complete unwind of the tape is equal to n times the track pitch h. The playback head delivers a signal corresponding to a previously recorded information component. This signal is used in the same manner as the signal $S_1$ in the playback device of FIG. 7 for the purpose of servo-controlling the position of the stack of heads 5 with respect to the last recorded track. The servo-control loop may be the same as in FIG. 7, but not necessarily so. This variant imparts greater regularity to the tracks. Playback is facilitated, and the servo-control loops of the playback device may be simplified. In particular, the risk of track overlap upsetting playback is avoided.

Without departing from the scope of the invention it is also possible to use a moving-coil electrodynamic motor capable of displacing the heads over the whole width of the tape. In this case, it is this motor which imparts continuous forward movement to the heads, and provides wobbulation and correction of departure in tracking errors.

A variant in the arrangement of the gaps 1 to 4 of the stack of heads 5 is illustrated in FIG. 8. According to this variant, the gaps of the playback or recording heads, while remaining aligned on the same axis y, have their own axes angularly offset with respect to y at an alternately positive and negative angle having a value of α. Thus two adjacent gaps, 1 and 2 for example, do not form an extension of one another. This arrangement makes it possible to reduce crosstalk between the tracks 10, 20, 30, 40 respectively described by the gaps 1, 2, 3, 4. Should there be any overlap between two adjacent tracks, 10 and 20 for example, the gap 1 which is reading out an information element written in at a given instant onto the track 10, instead of reading out a part of an information element written in at the same instant onto the track 20, which would be the case with the arrangement of FIG. 4, reads out some of the information written in onto a certain length of the track 20, forming several information elements written in at different instants. If this length, which depends on the angle α, is sufficient, the obtained mean error tends to cancel out. In practice, the problem of crosstalk is solved for small values of α: around 15°. It is therefore thoroughly advantageous to adopt differentiated azimuth settings for the different heads of the stack. The arrangement of gaps illustrated in FIG. 8 makes it possible to embody a tracking servo-control loop on playback which is different from and more sensitive than that of FIG. 7. An offset Δh of each head with respect to the track which must be followed produces a phase-shift in read out the signal with respect to the information as it was recorded. In order to evaluate this phase-shift, it is necessary to have available synchronising pulses recorded at the same time as the information on at least two of the tracks. In the case of recording a television signal, the pulses in question are for example the line synchronising pulses referred to above. The speed of the tape 6 having been regulated on recording, the pulses are simultaneously written in onto each track at regular intervals. FIG. 9 illustrates the location of two of these pulses on the tracks 10 and 20: 110 and 120 on the track 10, 210 and 220 on the track 20. It has been assumed in this FIG. that the radial following error is zero when these pulses 110 and 210 are read out. The gaps 1 and 2 then read out the pulses 110 and 210 at the same time. It will be seen in the FIG. that when the pulses 120 and 220 are being read out the the heads are offset with respect to the tracks by a value of Δh. It will then be found that the pulse 120 is read out when the gaps are in position 1a and 2a, and the pulse 220 is read out, with a temporal phase-shift (after in the case of the FIG.), when the gaps are in position 1b and 2b offset with respect to the positions 1a and 2a by a length of track Δx. The pulses present in the signals $S_1$ and $S_2$ will therefore be phase-shifted. The value of the phase-shift increases with Δh, and its polarity depends on the tracking error Δh. The loop illustrated in FIG. 10 uses the results shown hereinbefore. It comprises two decoders 31 and 32 making it possible to extract the line synchronising pulses $I_1$ and $I_2$ respectively present in the signals $S_1$ and $S_2$. The pulses $I_1$ and $I_2$ are phase-compared by a comparator 33, which delivers a signal proportional to the phase-shift between $I_1$ and $I_2$ which, after amplification by an amplifier 34, constitutes the error signal Δv applied to the same electrodynamic motors 17 as that of FIG. 7. The mean value of the signal Δv obtained by means of the low-pass filter 26, as in FIG. 7, controls the motor 7. The diagram of FIG. 9 enables it to be established that, V being the speed of the tape 6, the time-interval separating the pulses $I_1$ and $I_2$ has a value of $\Delta t = (\Delta x/V) = 2\Delta h \sin \alpha/V$. For x=15° and V=2.5 m/s, the result is Δt=0.2 Δh. For example, for h=1 μm, Δt=0.2 μs, the interval between two successive line synchronising pulses being 64 μs. Such an interval can easily be detected, which gives good sensitivity of the loop with an angle α which is small enough to have a negligible effect on the recording pass-band and the track width, and therefore on the length of recording and the radial speed of displacement of the stack of heads 5.

It is necessary to use a coder 15 (FIG. 6) and a decoder 150 (FIG. 7) in order to split up the information signal S to be recorded into n components having a pass-band adapted to the possibilities of the magnetic heads and to reconstitute this signal from the n signals delivered on playback. There are various coding processes, of the analogue or numerical type. FIG. 11 illustrates as an example a coder which carries out analogue coding for n=4. It comprises 4 field-effect transistors 41, 42, 43, 44 whereof the sources are connected to ground by way of capacitors $C_1$, $C_2$, $C_3$, $C_4$. Control pulses $H_1$, $H_2$, $H_3$, $H_4$ of very short duration, at the same frequency F and regularly offset from one another in time are applied to the grids of the transistors 41 to 44 respectively, causing them to pass successively from the cut-off state to the conductive state. The information signal S is applied to the drains of the 4 transistors. The charge voltages $V_1$, $V_2$, $V_3$, $V_4$ appearing across the terminals of the capacitors $C_1$, $C_2$, $C_3$, $C_4$ respectively represent samples of the signal S during the respective durations of the control pulses. These pulses remain constant between two successive memorising pulses. The control pulses $H_1$ to $H_4$ emanate from a shift-register 46 controlled by a clock signal H at a frequency of 4F (more generally nF) emanating from a generator 45. The chronograms given in FIG. 12 show on an example the mechanism of splitting up a signal S into 4 components $V_1$ to $V_4$. The pulses $H_1$ to $H_4$ occur respectively at the instants $t_1$ to $t_4$ which are such that $t_2 - t_1 = t_3 - t_2 = t_4 - t_3 = (1/4F)$. The signal S having a pass-band of B, F is chosen to be of the same order of magnitude as (B/4). The signals $V_1$ to $V_4$ have a pass-band approximately equal to (B/4) (more generally (B/n). They could be supplied directly to the 4 magnetic heads of the recording device. In order to improve the signal-to-noise ratio, it is preferred to use them in order of frequency-modulate a carrier P emanating from an oscillator 55 at a frequency Fo higher than F but lower than or equal to the pass-band which can be attained with the heads used. This frequency-modulation is carried out by 4 similar modulators 51, 52, 53, 54, which deliver the signals $S_1$, $S_2$, $S_3$, $S_4$ respectively intended to be supplied to the magnetic heads. By way of example, the recording head according to the invention is intended to record video information with a pass-band of 10 MHz. For this purpose, 8 magnetic heads enabling tracks with a pass-band of 2 MHz to be traced are used. Fo=2 MHz and F=1.25 MHz are chosen, so that 8F=10 MHz.

In order to decode the signals $S_1$, $S_2$, $S_3$, $S_4$ picked up across the magnetic heads after demodulation at the instant of playback, use may be made of the gates 41, 42, 43, 44 controlled by the same clock signals $H_1$, $H_2$, $H_3$, $H_4$. Each demodulated signal is supplied to the input of one of the gates. Since the latter operate one after the other, the signal S is obtained by combining the signals picked up at their outputs.

What we claim is:

1. A video tape recording and playback device comprising an endless magnetic tape, magnetic head means having at least two gaps stacked across the width of said tape, tape driving means for continuously moving said tape past said magnetic head means, and head moving means for laterally moving said magnetic head means in a direction perpendicular to the direction of transport of said tape; said gaps having axes angularly offset by equal positive and negative values in relation to said direction; said gaps recording along said tape a timing signal on two equally spaced tracks; said magnetic head means supplying two playback signals upon reading out said tracks with two gaps in azimutal alignment with said gaps; phase comparator means being provided for supplying in response to said playback signal a control voltage corresponding to the phase shift between said playback signals; said control voltage being fed back to a control input of said head moving means for cancelling out at playback any lateral offset of said gaps in relation with said tracks.

2. A device as claimed in claim 1, wherein said head means includes at least n magnetic heads, n being an integer at least equal to 2; said n heads being integral with one another; the centres of the gaps of said heads being aligned in said direction y; said gaps following n continuous tracks forming, in said direction y, parallel portions of tracks having a pitch h.

3. A device as claimed in claim 2, wherein the distance between the centres of two adjacent gaps is equal to h; the distance traversed by each of said heads in said direction y during the unwinding of the total length of said tape being equal to $n \times h$.

4. A device as claimed in claim 2, wherein the distance between the centre of two adjacent gaps is equal to $h_1$ greater than h; the distances traversed by each of said heads in said direction y during the unwinding of the total length of said tape being equal to h; the width of said tape in said direction y being greater than or equal to $n \times h_1$.

5. A playback device as claimed in claim 4, wherein said timing signal comprises two series of synchronizing pulses synchronously recorded at the same time as said information with a fixed frequency $f_o$.

6. A device as claimed in claim 1, enabling an information signal having a pass-band B to be recorded by n magnetic recording heads in the form of n tracks on a magnetic tape so as to be able to be read out by scanning of said tracks by n magnetic playback heads, said recording device further comprising coding means for splitting up said signal into n electrical recording signals having a pass-band less than B; the two terminals of said n recording heads being simultaneously and respectively supplied by said n recording signals.

* * * * *